United States Patent
Winkelman et al.

(10) Patent No.: US 12,034,623 B1
(45) Date of Patent: Jul. 9, 2024

(54) SYSTEMS AND METHODS FOR LIGHTWEIGHT BANDWIDTH ESTIMATION

(71) Applicant: Cable Television Laboratories, Inc., Louisville, CO (US)

(72) Inventors: Eric Winkelman, Boulder, CO (US); Mario Di Dio, Longmont, CO (US); Richard D. Terpstra, Superior, CO (US); Zackary Foreman, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 246 days.

(21) Appl. No.: 17/460,596

(22) Filed: Aug. 30, 2021

Related U.S. Application Data

(60) Provisional application No. 63/071,789, filed on Aug. 28, 2020.

(51) Int. Cl.
| | | |
|---|---|---|
| *H04L 43/0894* | (2022.01) | |
| *H04L 7/00* | (2006.01) | |
| *H04L 43/0888* | (2022.01) | |

(52) U.S. Cl.
CPC ........ *H04L 43/0894* (2013.01); *H04L 7/0008* (2013.01); *H04L 43/0888* (2013.01)

(58) Field of Classification Search
CPC ............... H04L 43/0894; H04L 7/0008; H04L 43/0888
USPC ....................................................... 709/224
See application file for complete search history.

(56) References Cited

U.S. PATENT DOCUMENTS

| | | | | |
|---|---|---|---|---|
| 2006/0045031 A1* | 3/2006 | Hickey | .................. | H04L 25/14 370/266 |
| 2007/0008897 A1* | 1/2007 | Denton | .................. | H04L 43/50 370/389 |
| 2017/0026259 A1* | 1/2017 | Hagh | .................. | H04L 43/0894 |
| 2022/0294727 A1* | 9/2022 | Azzam | .................. | H04L 47/125 |

FOREIGN PATENT DOCUMENTS

| | | | | |
|---|---|---|---|---|
| CN | 103618640 A | * | 3/2014 | |
| JP | 4361699 B2 | * | 11/2009 | ........ H04W 56/0085 |
| JP | 2014116771 A | * | 6/2014 | |
| KR | 20070056954 | * | 6/2007 | |
| TW | I399049 B | * | 6/2013 | |

* cited by examiner

*Primary Examiner* — June Sison
*Assistant Examiner* — Mariegeorges A Henry
(74) *Attorney, Agent, or Firm* — PdZ Patent Law, PLLC

(57) ABSTRACT

A method for estimating a bandwidth characteristic of a communication link between a transmitter node and receiver node includes (1) receiving, from the receiver node, a plurality of synchronization data packets sent by the transmitter node via the communication link, (2) estimating an offset time representing a time required for each synchronization data packet to traverse the communication link, (3) receiving, from the receiver node, a plurality of test data packets sent by the transmitter node via the communication link, and (4) estimating the bandwidth characteristic of the communication link at least partially based on the offset time and characteristics of one or more of the plurality of synchronization data packets and one or more of the plurality of test data packets.

16 Claims, 4 Drawing Sheets

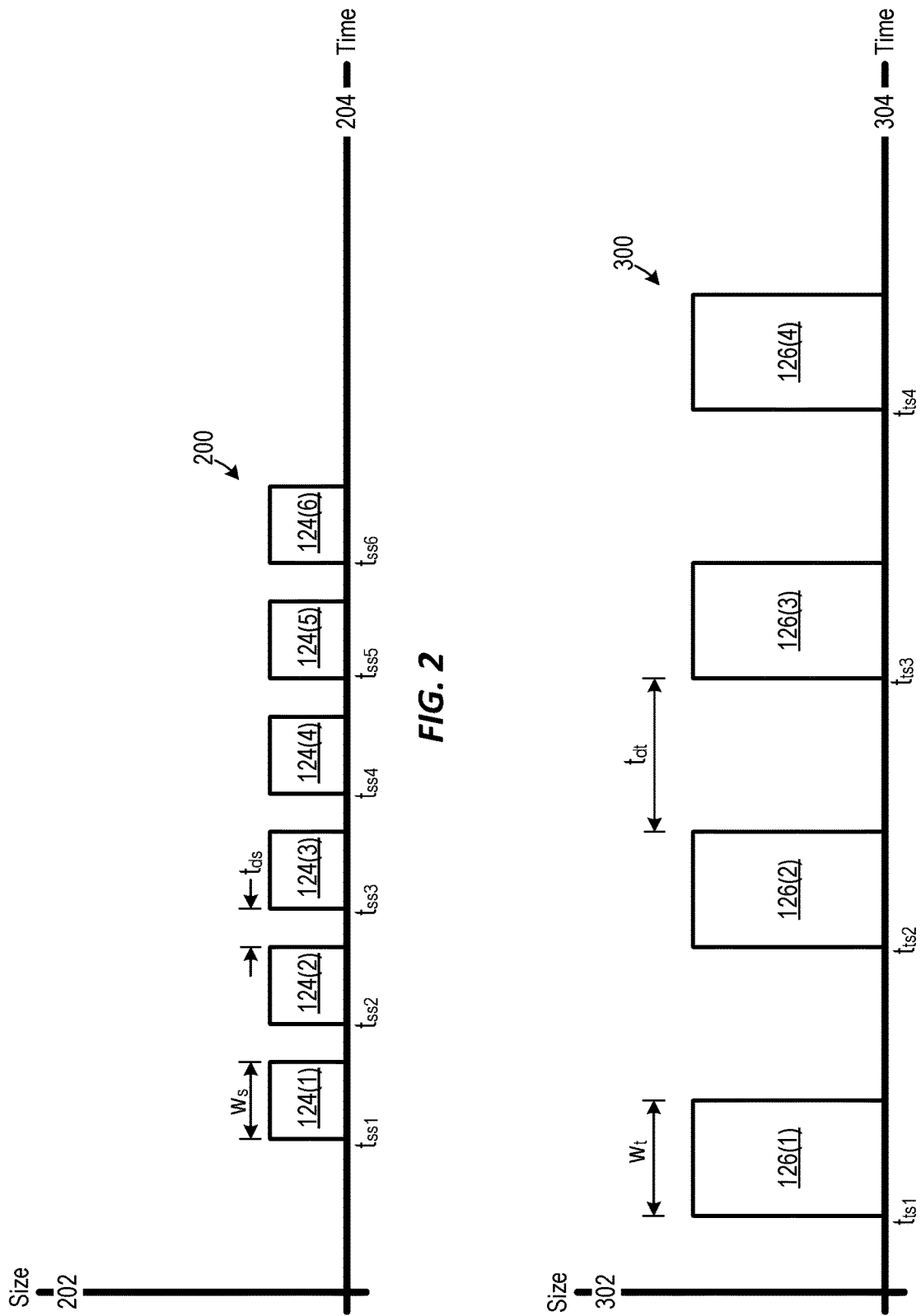

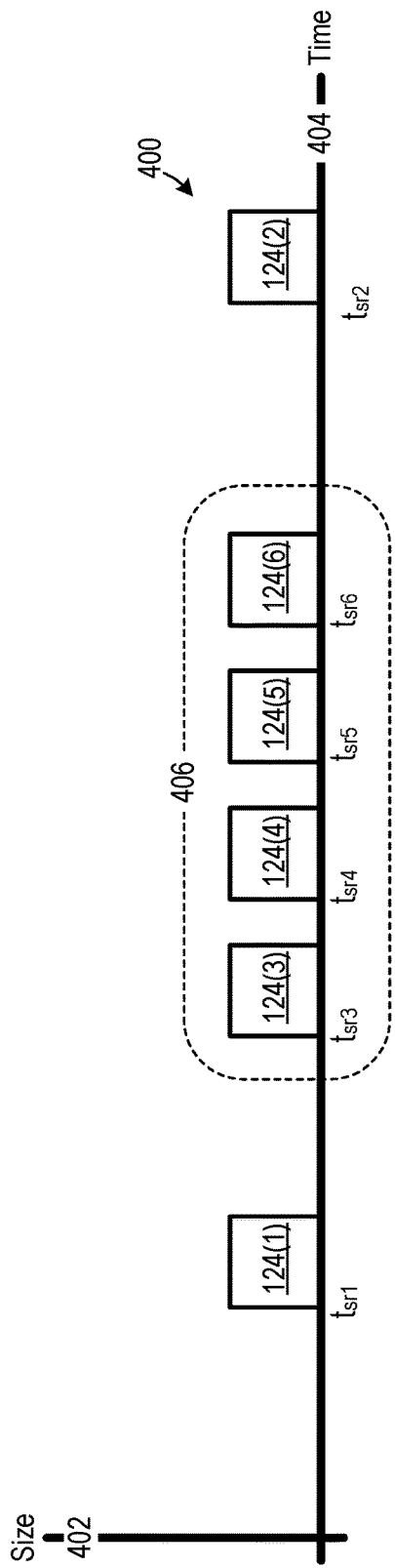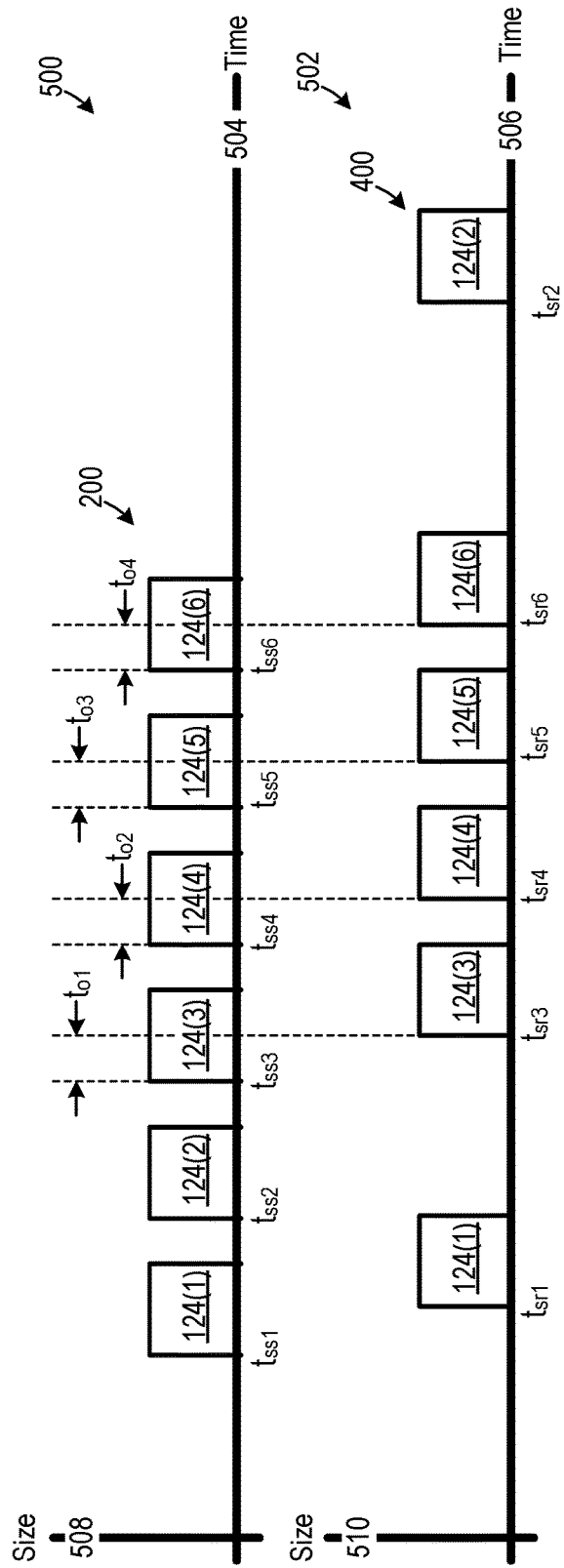

SYSTEMS AND METHODS FOR LIGHTWEIGHT BANDWIDTH ESTIMATION

RELATED APPLICATIONS

This application claims benefit of priority to U.S. Provisional Patent Application Ser. No. 63/071,789, filed on Aug. 28, 2020, which is incorporated herein by reference.

BACKGROUND

Communication networks are very common in modern society. For example, access communication networks are widely used to provide communication services, such as Internet service, telephone service, video service, etc., to end users in respective geographic areas. As another example, long-haul communication networks are extensively used to transport data across long distances, such as across continents or across oceans.

Demand for communication services continues to grow, and design bandwidth of communication networks is accordingly growing. For example, next generation cable communication networks are anticipated to support bandwidths of 10 gigabits per second (Gpbs) or even greater. As another example, passive optical networks (PONs) routinely support bandwidths of at least 1 Gpbs, and emerging fifth generation (5G) cellular wireless communication networks promise to offer bandwidth of at least several hundred megabits per second (Mpbs) under typically operating conditions.

Modern communication networks often include multiple paths for transmitting data between network nodes. For example, a communication network serving a mobile telephone may be capable of transmitting data between the mobile telephone and a cellular core network via either a cellular wireless communication link or a Wi-Fi wireless communication link. As another example, a long-haul communication network may be capable of transmitting data between two cities via two or more separate optical cables.

BRIEF DESCRIPTION OF THE DRAWINGS

FIG. 2 is a graph illustrating an example of a series of synchronization data packets of the FIG. 1 communication network.

FIG. 3 is a graph illustrating an example of a series of test data packets of the FIG. 1 communication network.

FIG. 4 is a graph illustrating an example of a series of synchronization data packets received at a receiver node of the FIG. 1 communication network.

FIG. 5 includes graphs of synchronization data packets at a transmitter node of the FIG. 1 communication network and at the receiver node of the FIG. 1 communication network, respectively.

DETAILED DESCRIPTION OF THE EMBODIMENTS

Figure 1:
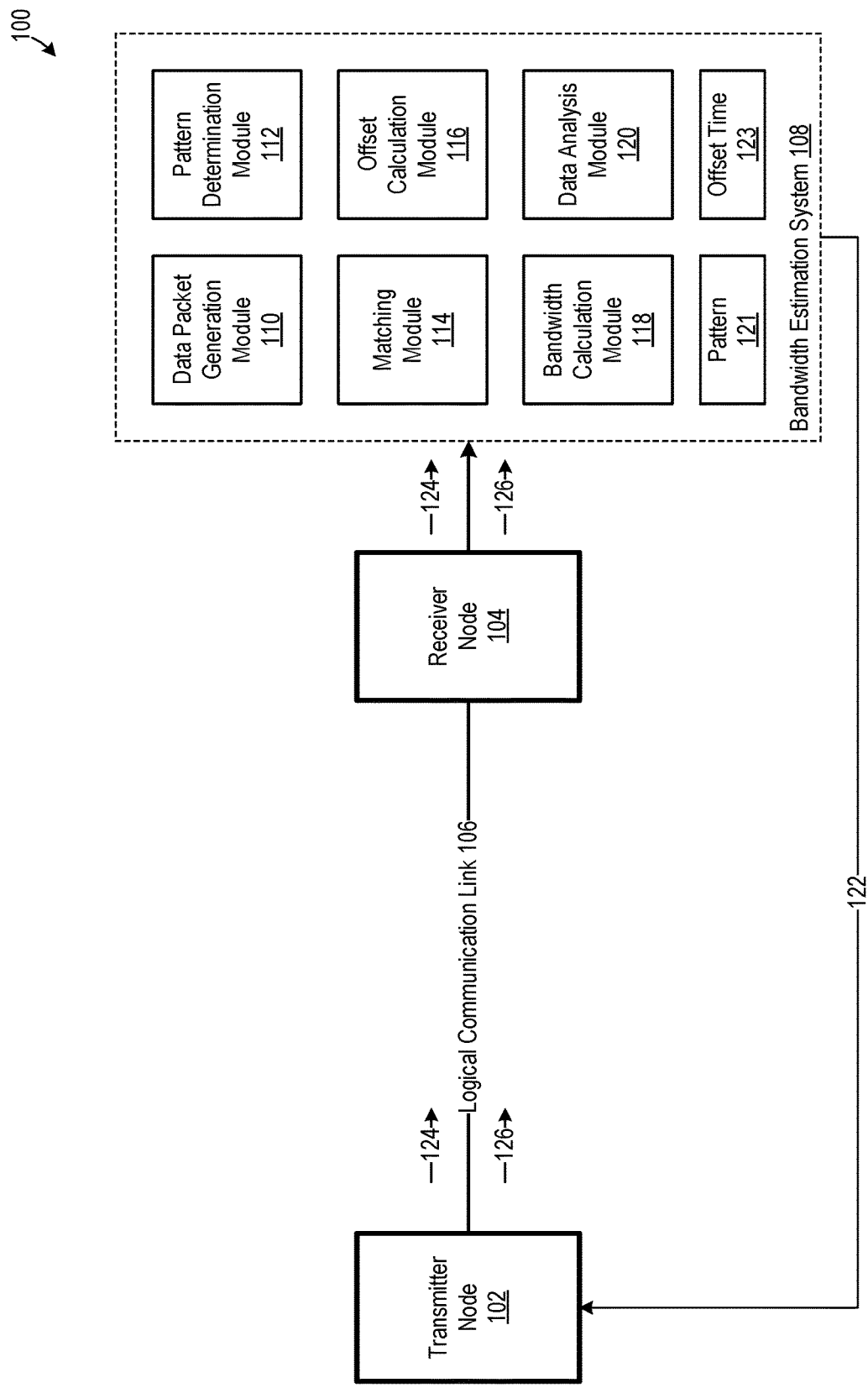
FIG. 1 is a block diagram of a communication network including a bandwidth estimation system, according to an embodiment.

One important communication network parameter is bandwidth, which is the amount of data a communication link can transfer per unit time. Bandwidth is commonly expressed in units such as bits per second (bps), kilobits per second (Kbps), megabits per second (Mbps), and gigabits per second (Gbps), although other units are possible. A communication link typically has a maximum theoretical bandwidth, but actual bandwidth at a given time may vary due to factors such as communication link load, communication link physical condition, communication link environment, and/or interference experienced by the communication link.

Accordingly, it is frequently desirable to estimate bandwidth of a communication link under current operating conditions, hereinafter referred to as "current bandwidth" of the communication link. For example, a communication network operator may wish to estimate current bandwidth of one or more communication links in its network to evaluate performance of its network. As another example, a network node capable of transmitting data via two or more different communication links may wish to estimate current bandwidth of these communication links to assist the network node in selecting which communication link to use for its data transmission. As an additional example, a purchaser of communication network bandwidth may wish to estimate communication link current bandwidth to confirm that it is receiving promised bandwidth from its communication services provider.

Conventional methods for estimating communication link bandwidth include transmitting large amounts of data through a communication link and collecting associated metrics. While such conventional bandwidth estimation methods may achieve satisfactory performance, they have significant drawbacks. For example, conventional bandwidth estimation methods consume a significant portion, or even an entire portion, of a communication link's bandwidth, during the bandwidth estimation process. Consequently, conventional bandwidth estimation methods may limit, or even completely prevent, other use of a communication link during bandwidth estimation. Furthermore, communication link bandwidth is often a valuable commodity, and use of large amounts of communication link bandwidth for bandwidth estimation may therefore be costly.

Disclosed herein are systems and methods for lightweight bandwidth estimation which may at least partially overcome one or more of the problems discussed above. The new systems and methods advantageously do not require transmitting large amounts of data through a communication link to estimate its bandwidth. Instead, the systems and methods are capable of estimating communication link bandwidth from a series of small data packets transmitted through the communication link. Consequently, certain embodiments of the new systems and methods consume minimal communication link bandwidth and are therefore referred to as "lightweight." Indeed, some embodiments are even capable of estimating communication link bandwidth from data packets associated with normal data transmission, instead of requiring transmission of dedicated data packets for bandwidth estimation. Accordingly, the new systems and methods may enable frequent bandwidth estimation, such as for communication link monitoring over time, that would not be feasible using conventional bandwidth estimation methods.

FIG. 1 is a block diagram of a communication network 100 including a transmitter node 102, a receiver node 104, a logical communication link 106, and a bandwidth estimation system 108, where bandwidth estimation system 108 is one embodiment of the new systems for lightweight bandwidth estimation disclosed herein. Transmitter node 102 is configured to generate data packets, receiver node 106 is configured to receive data packets, and logical communication link 106 is configured to transmit data packets from transmitter node 102 to receiver node 104. Transmitter node 102 may be a physical transmitter node or a logical transmitter node, and receiver node 104 may be a physical receiver node or a logical receiver node.

Logical communication link 106 can have any configuration as long as it is capable of transmitting data packets from transmitter node 102 to receiver node 104. For example, logical communication link 106 may be embodied by a single physical communication link, such as a single electrical communication link, a single optical communication link, or a single wireless communication link. As another example, logical communication link 106 may be embodied by one or more communication systems, such as one or more of a cellular wireless communication system (e.g., operating in either licensed or unlicensed radio frequency spectrum according to a long term evolution (LTE) protocol, a fifth generation (5G) new radio (NR) protocol, and/or a sixth generation (6G) protocol), a Wi-Fi wireless communication system, a cable communication system (e.g., operating according to a Data Over Cable Service Interface Specification (DOCSIS) protocol), a digital subscriber line (DSL) communication system, an optical communication system (e.g., operating according to an Ethernet passive optical network (EPON) protocol, a radio frequency of over glass (RFOG or RFoG) protocol, or a Gigabit-capable passive optical network (GPON) protocol), and a satellite wireless communication system (e.g., using low earth orbit (LEO) satellites, medium earth orbit (MEO) satellites, or geostationary equatorial orbit (GEO) satellites).

Bandwidth estimation system 108 includes a data packet generation module 110, a pattern determination module 112, a matching module 114, an offset calculation module 116, a bandwidth calculation module 118, and an optional data analysis module 120. Bandwidth Estimation System 108 is optionally also configured to store data, such as a pattern 121 (discussed below) and an offset time 123 (discussed below). Although the modules of bandwidth estimation system 108 are illustrated as being discrete elements, two or more of these modules could be combined. Additionally, while bandwidth estimation system 108 is illustrated as being proximate to receiver node 104, bandwidth estimation system 108 could be located elsewhere, such as proximate to transmitter node 102 or remote from both of transmitter node 102 and receiver node 104. Furthermore, bandwidth estimation system 108 could be distributed between two or more locations, such as between a location proximate to transmitter node 102 and a location proximate to receiver node 104. Moreover, bandwidth estimation system 108 could be partially or fully combined with one or more other elements, such as with transmitter node 102 and/or receiver node 104. In some embodiments, the modules of bandwidth estimation systems 108 are formed of analog electronic components and/or digital electronic components. For example, in particular embodiments, the modules of bandwidth estimation system 108 are at least partially embodied by one or more processors (not shown) configured to execute instructions stored in one or more storage subsystems (not shown), such as instructions in the form of software and/or firmware, to perform the functions of bandwidth estimation system 108.

FIG. 1 further illustrates a logical control link 122 between bandwidth estimation system 108 and transmitter node 102. Logical control link 122 is used by bandwidth estimation system 108 to control transmitter node 102 to send certain data packets to receiver node 104 for use by bandwidth estimation system 108, as discussed below. Logical control link 122 need not be a dedicated physical control link.

Data packet generation module 110 is configured to control transmitter node 102 via logical control link 122 to the cause transmitter node 102 to send a series of synchronization data packets 124 to receiver node 104 via logical communication link 106. Transmitter node 102 optionally sends synchronization data packets 124 to receiver node 104 according to a predetermined pattern, such as specified by data packet generation module 110. Successive synchronization data packets 124 are sufficiently separated in time from each other so that they will not interfere with each other. In some embodiments, a size of each synchronization data packet 124 is chosen to be a minimum amount of data that can be sent by logical communication link 106 without delaying data transmission to wait for additional data to include in the data packet. For example, in certain embodiments, each synchronization data packets 124 has a size of 400 bytes. It is important that a time when each synchronization data packet 124 is sent is known by bandwidth estimation system 108. Accordingly, in some embodiments, each synchronization data packet 124 includes a time stamp representing a respective time when the synchronization data packet was sent by transmitter node 102. Time stamps could alternately be sent from transmitter node 102 to bandwidth estimation system 108 in another manner, as long as each time stamp is correlated with its respective synchronization data packet 124. For example, time stamps could be sent from transmitter node 102 to bandwidth estimation system 108 via an additional logical communication link (not shown) between transmitter node 102 and bandwidth estimation system 108. Furthermore, in some other embodiment, synchronization data packets 124 are sent according to a predetermined schedule that is known to bandwidth estimation system 108, such that there is no need to send time stamps from transmitter node 102 to receiver node 104.

FIG. 2 is a graph illustrating an example of a series 200 of synchronization data packets 124. In this document, specific instances of an item may be referred to by use of a numeral in parentheses (e.g. synchronization data packet 124(1)) while numerals without parentheses refer to any such item (e.g. synchronization data packets 124). A vertical axis 202 of FIG. 2 represents data packet size, and a horizontal axis 204 of FIG. 2 represents time. While FIG. 2 illustrates series 200 as including six synchronization data packets 124, the number of synchronization data packets 124 in series 200 may vary and is implementation dependent. Synchronization precision (discussed below) increases with number of synchronization data packets 124 in series 200, but bandwidth consumed by bandwidth estimation system 108 also increases with number of synchronization data packets 124 in series 200.

Transmitter node 102 sends synchronization data packets 124(1), 124(2), 124(3), 124(4), 124(5), and 126(6) to receiver node 104 at times $t_{ss1}$, $t_{ss2}$, $t_{ss3}$, $t_{ss4}$, $t_{ss5}$, and $t_{ss6}$, respectively. In some embodiments, these times are represented by respective time stamps (not shown) in synchronization data packets 124 (or separately transmitted from transmitter node 102 to bandwidth estimation system 108), while in some other embodiments, these times are part of a predetermined schedule known to bandwidth estimation system 108. Synchronization data packets 124 are illustrated as having a uniform size, as well as a uniform duration represented by pulse with $W_s$, in FIG. 2. However, synchronization data packets 124 could have varying sizes and/or durations as long as bandwidth estimation system 108 is knowledgeable of these sizes and durations. Additionally, while FIG. 2 depicts separation time $t_{ds}$ as being uniform between successive synchronization data packets 124, separation time $t_{ds}$ could also vary in series 200 as long as bandwidth estimation system 108 has knowledge of this variation. Finally, while data packet generation module 110 causes synchronization data pulses 124 to be generated for use by bandwidth estimation system 108, in some alternate embodiments, synchronization data pulses 124 are instead data packets that are generated for the purpose transmitting data from transmitter node 102 to receiver node 104, and bandwidth estimation system 108 has knowledge of synchronization data pulse timing and size.

Data packet generation module 110 is further configured to control transmitter node 102 via a logical control link 122 to the cause transmitter node 102 to send a series of test data packets 126 to receiver node 104 via logical communication link 106. Similar to synchronization data packets 124, successive test data packets 126 are sufficiently separated in time from each other so that they will not interfere with each other. Test data packet size 126 size must differ from synchronization data packet size 124 to perform bandwidth estimation (discussed below). A size of each test data packet 126 is chosen, for example, to match data packet size under operating conditions of interest. For example, assume that bandwidth is of interest while logical communication link 106 is transmitting non-fragmented data. A size of each test data packet 126 may be chosen to maximize an amount of data that can be sent in a single data packet, to avoid causing the data to be fragmented among multiple data packets, for consistency with operating conditions of interest. As another example, assume that bandwidth is of interest while logical communication link 106 is transmitting fragmented data. Test data packets 126 may be chosen to span multiple data packets, for consistency with operating conditions of interest. As another example, assume that bandwidth is of interest while logical communication link 106 is transmitting voice audio data. Size of test data packets 126 could be chosen to be similar to anticipated size of voice audio data packets, for consistency with operating conditions of interest. It is important that a time when each test data packet 126 is sent is known by bandwidth estimation system 108. Accordingly, in some embodiments, each test data packets 126 includes a time stamp representing a respective time when the test data packet was sent by transmitter node 102, or time stamps are sent from transmitter node 102 to bandwidth estimation system 108 in another manner, such as via an additional logical communication link (not shown) between transmitter node 102 and bandwidth estimation system 108. In some other embodiment, test data packets 126 are sent according to a predetermined schedule that is known to bandwidth estimation system 108.

FIG. 3 is a graph illustrating an example of a series 300 of test data packets 126. A vertical axis 302 of FIG. 3 represents data packet size, and a horizontal axis 304 of FIG. 3 represents time. While FIG. 3 illustrates series 300 as including four test data packets 126, the number of test data packets 126 in series 300 may vary and is implementation dependent. Bandwidth estimation accuracy advantageously increases with number of test data packets 126 in series 300, but bandwidth consumed by bandwidth estimation system 108 also increases with number of test data packets 126 in series 300.

Transmitter node 102 sends test data packets 126(1), 126(2), 126(3), and 126(4) to receiver node 104 at times $t_{ts1}$, $t_{ts2}$, $t_{ts3}$, and $t_{ts4}$, respectively. In some embodiments, these times are represented by respective time stamps (not shown) in test data packets 126, while in some other embodiments, these times are part of a predetermined schedule known to bandwidth estimation system 108. Test data packets 126 are illustrated as having a uniform size, as well as uniform duration as represented by pulse with $W_t$, in FIG. 3. However, test data packets 126 could have varying sizes and/or durations as long as bandwidth estimation system 108 is knowledgeable of their sizes. Additionally, while FIG. 3 depicts separation time $t_{dt}$ as being uniform between successive test data packets 126, separation time $t_{dt}$ could also vary in series 300 as long as bandwidth estimation system 108 has knowledge of this variation. Furthermore, while data packet generation module 110 causes test data pulses 126 to be generated for use by bandwidth estimation system 108, in some alternate embodiments, test data packets 126 are instead data packets that are generated for the purpose transmitting data from transmitter node 102 to receiver node 104, and bandwidth estimation system 108 has knowledge of test data pulse timing and size. Data packet generation module 110 is optionally omitted in embodiments where test data packets 126 and synchronization data packets 124 are data packets generated for transmitting data, instead of data packets generated specially generated for use by bandwidth estimation system 108.

Transmitter node 102 may send all synchronization data packets 124 before sending any test data packets 126 (or vice versa). Alternately, transmitter node 102 may intermix test data packets 126 with synchronization data packets 124. For example, transmitter node 102 may send a synchronization data packet 124, followed by a test data packet 126, followed by another synchronization data packet 124, followed by another test data packet 126, and so on.

Receiver node 104 receives synchronization data packets 124 and records a respective time that each synchronization data packet 124 is received. Additionally, receiver node 104 receives test data packets 126 and records a respective time that each test data packet 126 is received. Receiver node 104 provides synchronization data packets 124 and test data packets 126 to bandwidth estimation system 108. Bandwidth estimation system 108 is configured to estimate current bandwidth of logical communication link 106 from synchronization data packets 124 and test data packets 126 using a method that includes a synchronization procedure and an estimation procedure, as discussed below.

Synchronization Procedure

The purpose of the synchronization procedure is to determine offset time 123, which is an amount of time required for a synchronization data packet 124 to traverse logical communication link 106, i.e., for the synchronization data packet 124 to travel from transmitter node 102 to receiver node 104 via logical communication link 106. Bandwidth estimation system 108 is configured to use to offset time 123, for example, to help match times that test data packets 126 are received at receiver node 104 with times that test data packets 126 are sent by transmitter node 102 (or vice versa), as discussed below. Transit time, i.e., time for synchronization data packets 124 to traverse communication link 106, would be consistent under ideal operating conditions of communication network 100. However, some synchronization data packets 124 will likely be delayed due to congestion, under realistic operating conditions of communication network 100. Consequently, transit time will typically vary among synchronization data packets 124. Specifically, transit time will be a minimum value for synchronization data packets 124 that are not delayed, and transit time will randomly vary among synchronization data packets that are delayed. Accordingly, pattern determination module 112, matching module 114, and offset calculation module 116 may be configured to collectively determine offset time 123 as the expected minimum transit time of synchronization data packets 124. However, pattern determination module 112, matching module 114, and offset calculation module 116 could be configured so that offset time 123 represents a different transit time of synchronization data packets 124, including but not limited, an absolute minimum transit time (such as for estimating best-case bandwidth), or a mathematical function of a plurality of transit times (such as average transit time, median transit time, a function of N minimum or maximum transit times where N is an integer greater than one or N is a percentage, etc).

Expected minimum transit time differs from absolute minimum transit time in that expected minimum transit time is minimum transit determined from a plurality of synchronization data packets 124 and excludes any outlier synchronization data packets 124. For example, assume (a) a plurality of synchronization data packets 124 have a transit time of m, (b) a single synchronization data packet 124 has a transit time of n, and (c) n is less than m. Expected minimum transit time would be m, instead of n, because n is an outlier and is not representative of the minimum transit time of the majority of synchronization data packets 124. Absolute minimum transit time, in contrast, would be n, because n is the absolute minimum transit time of all synchronization data packets.

Pattern determination module 112 is configured to determine a transmission pattern 121 of synchronization data packets 124, where transmission pattern 121 indicates times when transmitter node 102 sends synchronization data packets 124 to receiver node 104. In some embodiments, pattern determination module 112 is configured to determine transmission pattern 121 by creating a list of synchronization data packets 124 transmission times in ascending order. For example, Table 1 below is an example of transmission pattern 121 for series 200 of synchronization data packets 124 (FIG. 2). Pattern determination module 112 creates the table, for example, from time stamp information included in, or correlated with, synchronization data packets, 124 or from a schedule of transmission times known to bandwidth estimation system 108.

TABLE 1

| Pattern 121 |
| --- |
| $t_{ss1}$ |
| $t_{ss2}$ |
| $t_{ss3}$ |
| $t_{ss4}$ |
| $t_{ss5}$ |
| $t_{ss6}$ |

Matching module 114 is configured to identify synchronization data packets 124 in data packets received by receiver node 104 by finding a match between transmission pattern 121 and the received data packets. In some embodiments, matching module 114 is configured to use a correlation technique to determine a best match between transmission pattern 121 and received data packets, such as by determining a minimum difference between transmission times of synchronization data packets 124 and receiving time of synchronization data packets 124. For example, assume that receiver node 104 receives synchronization data packets 124 as a series 400 shown in a graph of FIG. 4, where vertical axis 402 represents size and horizontal axis 404 represents time. Receiver node 104 receives synchronization data packets 124(1), 124(2), 124(3), 124(4), 124(5), and 124(6) at times $t_{sr1}$, $t_{sr2}$, $t_{sr3}$, $t_{sr4}$, $t_{sr5}$, and $t_{sr6}$, respectively. Synchronization data packets 124(1), 124(3), 124(4), 124(5), 124(6) timely arrive at receiver node 104, while synchronization data packet 124(2) is significantly delayed, in the FIG. 4 example. Matching module 114 is unable to match entire transmission pattern 121 to series 400, due to synchronization data packet 124(2) being delayed. However, matching module 114 is able to match transmission pattern 121 times $t_{ss3}$, $t_{ss4}$, $t_{ss5}$, and $t_{ss6}$ to a portion 406 of series 400, and bandwidth estimation module 108 accordingly uses one or more of synchronization data packets 124(3), 124(4), 124(5), 124(6) to determine offset time 123.

Specifically, offset calculation module 116 estimates offset time 123 from a difference between respective transmission times and respective receiving times of one or more of synchronization data packets 124(3), 124(4), 124(5), 124(6), where transmission time is a time that transmitter node 102 sends the transmission data packet 124 and receiving time is a time that receiver node 104 receives the same synchronization data packet 124. For example, FIG. 5 includes graphs 500 and 502 of synchronization data packet 124 sequence 200 (at transmitter node 102) and synchronization data packet 124 sequence 400 (at receiver node 104), respectively. Each of graphs 500 and 502 has a common time base represented by horizontal axes 504 and 506, respectively. Axes 508 and 510 of graphs 500 and 502, respectively, represent size.

Any of synchronization data packets 124(3), 124(4), 124(5), and 124(6) are good candidates for estimating offset time 123, assuming offset time 123 is to represent expected minimum transit time, because none of these data packets is significantly delayed. Synchronization data packet 124(1) is also not delayed and therefore could be used to estimate offset time 123. However, synchronization data packet 124(1) was not matched to pattern 121, and synchronization data packet 124(1) is therefore not considered by offset calculation module 116 when estimating offset time 123. Offset time $t_{o1}$ associated with synchronization data packet 124(3) is equal to $t_{sr3}$-$t_{ss3}$, and offset time $t_{o2}$ associated with synchronization data packet 124(4) is equal to $t_{sr4}$-$t_{ss4}$. Similarly, offset $t_{o3}$ associated with synchronization data packet 124(5) is equal to $t_{sr5}$-$t_{ss5}$, and offset time $t_{o4}$ associated with synchronization data packet 124(6) is equal to $t_{sr6}$-$t_{ss6}$. In some embodiments, offset calculation module 116 is configured to estimate offset time 123 by designating a minimum one of offset times $t_{o1}$, $t_{o2}$, $t_{o3}$, and $t_{o4}$ as offset time 123, while in some other embodiments, offset calculation module 116 is configured to estimate offset time 123 by designating a mathematical function (e.g., average or median) of offset times $t_{o1}$, $t_{o2}$, $t_{o3}$, and $t_{o4}$ as offset time 123. A single offset time 123 estimate can be used repeatedly in the estimation procedure discussed below until there is reason to believe that offset time may have changed.

Large sequences of synchronization data packets 124 promote synchronization precision, i.e., accurate estimation of offset time 123, by increasingly likelihood of a strong match between transmission pattern 121 and received synchronization data packets 124, as well as increasing likelihood of receiving at least some synchronization data packets 124 at receiver node 104 without delay. However, large sequences of synchronization data packets 124 increase amount of bandwidth of logical communication link 106 that is consumed by bandwidth estimation system 108, as well as processing requirements of bandwidth estimation system 108.

Estimation Procedure

Bandwidth calculation module 118 is configured to estimate bandwidth of logical communication link 106 at least partially based on offset time 123, a time that receiver node 104 receives a test data packet 126, a size of the test data packet, and a size of a synchronization data packet 124 used to establish offset time 123. For example, some embodiments are configured to estimate bandwidth B of logical communication link on a packet basis using EQN. 1 below, where $S_{test}$ is a size of a test data packet 126, $S_{sync}$ is a size of the synchronization data packet 124(s) used to determine offset time 123, $t_{tr}$ is a time that receiver node 104 received the test data packet 126, and $t_o$ is equal to offset time 123. EQN. 1 assumes that a size of the test data packet 126 is larger than a size of the synchronization data packet 124.

$$B = \frac{S_{test} - S_{sync}}{t_{tr} - t_0} \quad \text{(EQN. 1)}$$

Bandwidth calculation module 118 is optionally configured to periodically, or even continuously, estimate bandwidth of logical communication link 106 on a packet-by-packet basis, such as to monitor bandwidth of logical communication link 106 over an extended time. Optional data analysis module 120 is configured, for example, to determine bandwidth statistics, such as average bandwidth, median bandwidth, minimum bandwidth, and/or maximum bandwidth, of logical communication link 106 from a plurality of test data packet 126 bandwidth estimates. For instance, some embodiments of data analysis module 120 are configured to determine a running average bandwidth of logical communication link 106 using N most recent test data packets 126, where N is an integer greater than one.

Some embodiments of data analysis module 120 are configured to determine one or more parameters of logical communication link 106 in addition to bandwidth. For example, some embodiments of data analysis module 120 are further configured to determine a distribution of transmission offsets over time. This information can be used, for example, to characterize overall network performance, such as typical transmission delays beyond a best-case scenario. As another example, this information could be used as a metric to determine if communication network 100 is experiencing congestion and/or other issue.

Additionally, data analysis module 120 could be configured to analyze a distribution of bandwidth estimate over time. For example, data analysis module 120 could be configured to determine if bandwidth of communication link 106 is changing, such as increasing or decreasing, over time.

Additional Examples

Figure 6:
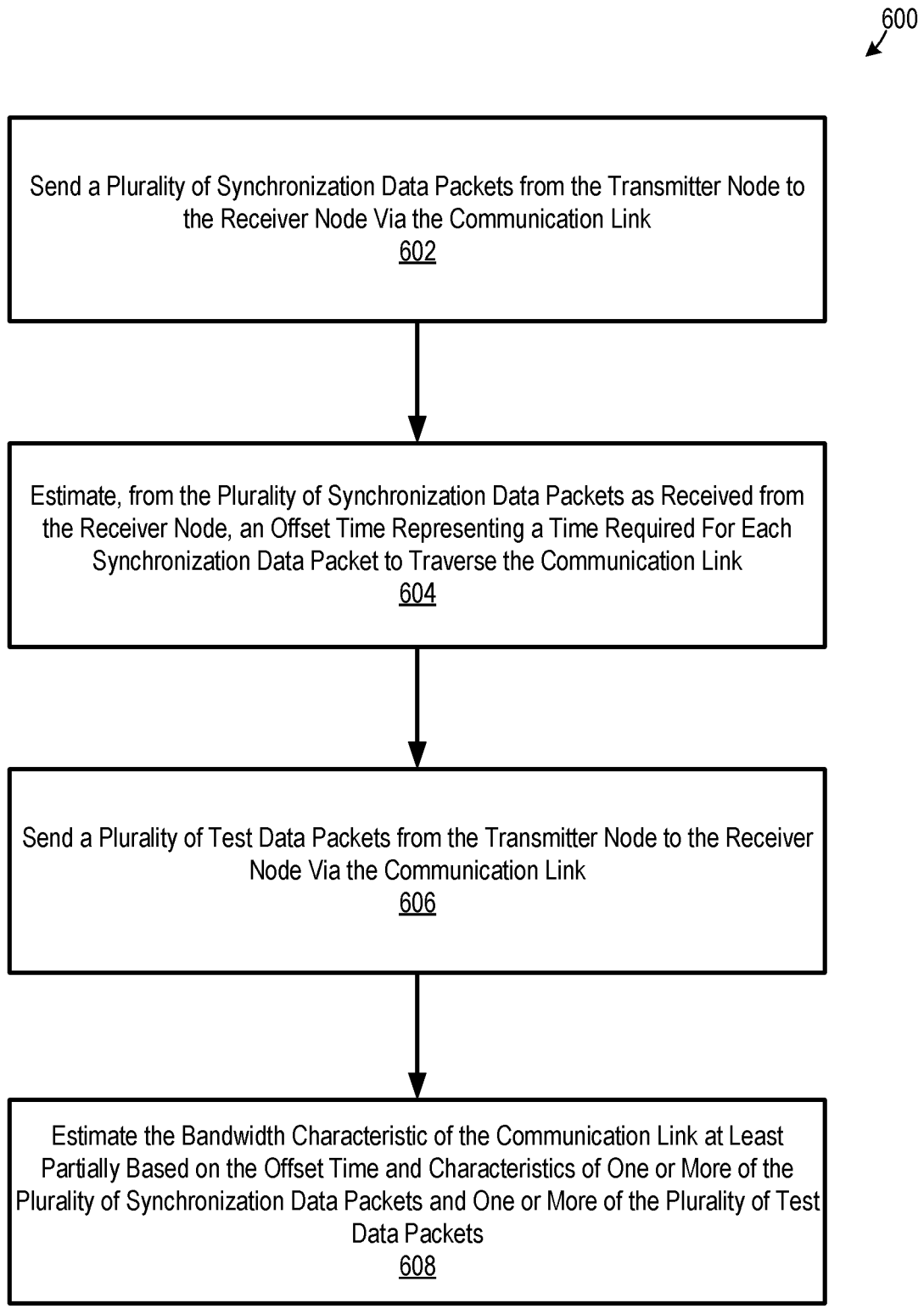
FIG. 6 is a flow chart of a method for estimating a bandwidth characteristic of a communication link between a transmitter node and a receiver node, according to an embodiment.

FIG. 6 is a flow chart of a method 600 for estimating a bandwidth characteristic of a communication link between a transmitter node and a receiver node. Method 600 is performed, for example, by some embodiments of communication network 100. In a block 602 of method 600, a plurality of synchronization data packets is sent from the transmitter node to the receiver node via the communication link. In one example of block 602, transmitter node 102 send series 200 of synchronization data packets 124 from transmitter node 102 to receiver node 104 via logical communication link 106. In a block 604 of method 600, an offset time, representing a time required for each synchronization data packet to traverse the communication link, is estimated from the plurality of synchronization data packets as received from the receiver node. In one example of block 604, pattern generation module 112, matching module 114, and offset calculation module 116 collectively estimate offset time 123 from series 400 of synchronization data packets 124 received by receiving node 104. In a block 606 of method 600, a plurality of test data packets is sent from the transmitter node to the receiver node via the communication link. In one example of block 606, transmitter node 102 send series 300 of test data packets 126 to receiver node 104 via logical communication link 106. In a block 608 of method 600, the bandwidth characteristic of the communication link is estimated at least partially based on the offset time and characteristics of one or more of the plurality of synchronization data packets and one or more of the plurality test data packets. In one example of block 608, bandwidth calculation module 118 estimates bandwidth of logical communication link 106 on a per data packet basis using EQN. 1 above or a variation thereof. In another example of block 608, bandwidth calculation module 118 and data analysis module 120 collectively estimate average bandwidth, median bandwidth, minimum bandwidth, or maximum bandwidth of logical communication link 106 from a plurality data packet bandwidth estimates.

Method 600 could be executed in a different manner by swapping roles of synchronization data packets and test data packets in the method. For example, block 604 could be modified to estimate offset time from time required for test data packets to traverse the communication link. In some embodiments, method 600 is first performed as discussed above with respect to FIG. 6, and method 600 is subsequently performed a second time after swapping roles of synchronization data packets and test data packets in the method.

Combinations of Features

Features described above may be combined in various ways without departing from the scope hereof. The following examples illustrate some possible combinations.

(A1) A method for estimating a bandwidth characteristic of a communication link between a transmitter node and a receiver node includes (1) receiving, from the receiver node, a plurality of synchronization data packets sent by the transmitter node via the communication link, (2) estimating an offset time representing a time required for each synchronization data packet to traverse the communication link, (3) receiving, from the receiver node, a plurality of test data packets sent by the transmitter node via the communication link, and (4) estimating the bandwidth characteristic of the communication link at least partially based on the offset time and characteristics of one or more of the plurality of synchronization data packets and one or more of the plurality of test data packets.

(A2) In the method denoted as (A1), estimating the offset time may include determining a difference between (1) transmission time of a first synchronization data packet of the plurality synchronization data packets at the transmitter node and (2) receiving time of the first synchronization data packet at the receiver node.

(A3) In the methods denoted as (A2), the first synchronization data packet may be selected to be a data packet that does not experience delay during transmission from the transmitter node to the receiver node.

(A4) In the method denoted as (A1), estimating the offset time may include (1) determining a transmission pattern of the plurality of synchronization data packets as sent by the transmitter node, (2) matching the transmission pattern to a first portion of the plurality of synchronization data packets received from the receiver node, and (3) determining the offset time from one or more synchronization data packets of the first portion of the plurality of synchronization data packets received from the receiver node.

(A5) In the method denoted as (A4), the transmission pattern may include a list of transmission times of the plurality of synchronization data packets in increasing order.

(A6) In any one of the methods denoted as (A1) through (A5), the plurality of synchronization data packets may be separated in time.

(A7) In any one of the methods denoted as (A1) through (A6), the plurality of test data packets may be separated in time.

(A8) In any one of the methods denoted as (A1) through (A7), the offset time may be one of (1) an absolute minimum time required for each synchronization data packet to traverse the communication link, (2) an expected minimum time required for each synchronization data packet to traverse the communication link, and (3) a mathematical function of a plurality of times required for synchronization data packets to traverse the communication link.

(B1) A method for estimating bandwidth of a communication link between a transmitter node and a receiver node includes (1) sending a plurality of synchronization data packets from the transmitter node to the receiver node via the communication link and (2) sending a plurality of test data packets from the transmitter node to the receiver node via the communication link, each test data packet of the plurality of test data packets having a different size than each synchronization data packet of the plurality of data packets.

(B2) In the method denoted as (B1), sending the plurality of synchronization data packets from the transmitter node to the receiver node via the communication link may include sending the plurality of synchronization data packets in a predetermined transmission pattern.

(B3) In any one of the methods denoted as (B1) and (B2), sending the plurality of synchronization data packets from the transmitter node to the receiver node via the communication link may include sending the plurality of synchronization data packets such that the plurality of synchronization data packets are separated in time.

(B4) In any one of the methods denoted as (B1) through (B3), sending the plurality of test data packets from the transmitter node to the receiver node via the communication link may include sending the plurality of test data packets such that the plurality of test data packets are separated in time.

(C1) A method for estimating a bandwidth characteristic of a communication link between a transmitter node and a receiver node includes (1) sending a plurality of synchronization data packets from the transmitter node to the receiver node via the communication link, (2) estimating, from the plurality of synchronization data packets as received from the receiver node, an offset time representing a time required for each synchronization data packet to traverse the communication link, (3) sending a plurality of test data packets from the transmitter node to the receiver node via the communication link, and (4) estimating the bandwidth characteristic of the communication link at least partially based on the offset time and characteristics of one or more of the plurality of synchronization data packets and one or more of the plurality test data packets.

(C2) In the method denoted as (C1), the offset time may be one of (1) an absolute minimum time required for each synchronization data packet to traverse the communication link, (2) an expected minimum time required for each synchronization data packet to traverse the communication link, and (3) a mathematical function of a plurality of times required for synchronization data packets to traverse the communication link.

(C3) In the method denoted as (C2), estimating the offset time may include (1) determining a transmission pattern of the plurality of synchronization data packets as sent by the transmitter node, (2) matching the transmission pattern to a first portion of the plurality of synchronization data packets as received from the receiver node, and (3) determining the offset time from one or more synchronization data packets of the first portion of the plurality of synchronization data packets as received from the receiver node.

(C4) In the method denoted as (C3), the transmission pattern may include a list of transmission times of the plurality of synchronization data packets in increasing order.

(C5) In any one of the methods denoted as (C1) through (C4), the plurality of synchronization data packets may be separated in time.

(C6) In any one of the methods denoted as (C1) through (C5), the plurality of test data packets may be separated in time.

(C7) In any one of the methods denoted as (C1) through (C6), each test data packet of the plurality of test data packets may be larger than each synchronization data packet of the plurality of synchronization data packets.

(C8) In any one of the methods denoted as (C1) through (C7), the plurality of test data packets may be intermixed with the plurality of synchronization data packets.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for estimating a bandwidth characteristic of a communication link between a transmitter node and a receiver node, the method comprising:
   receiving, from the receiver node, a plurality of synchronization data packets sent by the transmitter node via the communication link;
   estimating an offset time representing a time required for each synchronization data packet to traverse the communication link;
   receiving, from the receiver node, a plurality of test data packets sent by the transmitter node via the communication link; and
   estimating the bandwidth characteristic of the communication link at least partially based on the offset time and a difference between (a) a size of a first synchronization data packet of the plurality of synchronization data packets and (b) a size of a first test data packet of the plurality of test data packets.

2. The method of claim 1, wherein estimating the offset time comprises determining a difference between (a) transmission time of the first synchronization data packet at the transmitter node and (b) receiving time of the first synchronization data packet at the receiver node.

3. The method of claim 2, wherein the first synchronization data packet does not experience delay during transmission from the transmitter node to the receiver node.

4. The method of claim 1, wherein estimating the offset time comprises:

determining a transmission pattern of the plurality of synchronization data packets as sent by the transmitter node;

matching the transmission pattern to a first portion of the plurality of synchronization data packets received from the receiver node; and determining the offset time from one or more synchronization data packets of the first portion of the plurality of synchronization data packets received from the receiver node.

5. The method of claim 4, wherein the transmission pattern comprises a list of transmission times of the plurality of synchronization data packets in increasing order.

6. The method of claim 1, wherein the plurality of synchronization data packets are separated in time.

7. The method of claim 1, wherein the plurality of test data packets are separated in time.

8. The method of claim 1, wherein the offset time is one of (a) an absolute minimum time required for each synchronization data packet to traverse the communication link, (b) an expected minimum time required for each synchronization data packet to traverse the communication link, and (c) a mathematical function of a plurality of times required for synchronization data packets to traverse the communication link.

9. A method for estimating a bandwidth characteristic of a communication link between a transmitter node and a receiver node, the method comprising:

sending a plurality of synchronization data packets from the transmitter node to the receiver node via the communication link;

estimating, from the plurality of synchronization data packets as received from the receiver node, an offset time representing a time required for each synchronization data packet to traverse the communication link;

sending a plurality of test data packets from the transmitter node to the receiver node via the communication link; and estimating the bandwidth characteristic of the communication link at least partially based on the offset time and a difference between (a) a size of a first synchronization packet of the plurality of synchronization data packets and (b) a size of a first test data packet of the plurality test data packets.

10. The method of claim 9, wherein the offset time is one of (a) an absolute minimum time required for each synchronization data packet to traverse the communication link, (b) an expected minimum time required for each synchronization data packet to traverse the communication link, and (c) a mathematical function of a plurality of times required for synchronization data packets to traverse the communication link.

11. The method of claim 9, wherein estimating the offset time comprises:

determining a transmission pattern of the plurality of synchronization data packets as sent by the transmitter node;

matching the transmission pattern to a first portion of the plurality of synchronization data packets as received from the receiver node; and determining the offset time from one or more synchronization data packets of the first portion of the plurality of synchronization data packets as received from the receiver node.

12. The method of claim 11, wherein the transmission pattern comprises a list of transmission times of the plurality of synchronization data packets in increasing order.

13. The method of claim 9, wherein the plurality of synchronization data packets are separated in time.

14. The method of claim 9, wherein the plurality of test data packets are separated in time.

15. The method of claim 9, wherein each test data packet of the plurality of test data packets is larger than each synchronization data packet of the plurality of synchronization data packets.

16. The method of claim 9, wherein the plurality of test data packets are intermixed with the plurality of synchronization data packets.

* * * * *